TAP CHANGER SEQUENCE CHART

INVENTOR
Herbert L. Prescott

United States Patent Office 3,436,646
Patented Apr. 1, 1969

3,436,646
LOAD TAP CHANGER SYSTEMS INCLUDING PROTECTIVE APPARATUS FOR MONITORING THE OPERATION OF THE TRANSFER SWITCHES
Herbert L. Prescott, Brookfield, Ohio, assignor to Westinghouse Electric Corporation, Pittsburgh, Pa., a corporation of Pennsylvania
Filed Aug. 2, 1966, Ser. No. 569,729
Int. Cl. H02p *13/06, 13/04;* H02h *7/00*
U.S. Cl. 323—43.5                                 9 Claims

ABSTRACT OF THE DISCLOSURE

A tap changer system of the type which includes a single under-load transfer switch and two no-load transfer switches, including protective means which checks the tap changer system after each scheduled operation of the switches. If any of the switches fail to function, the protective means energizes signal means, to prevent the no-load transfer switches from being damaged due to opening or closing under load.

---

Figure 1:
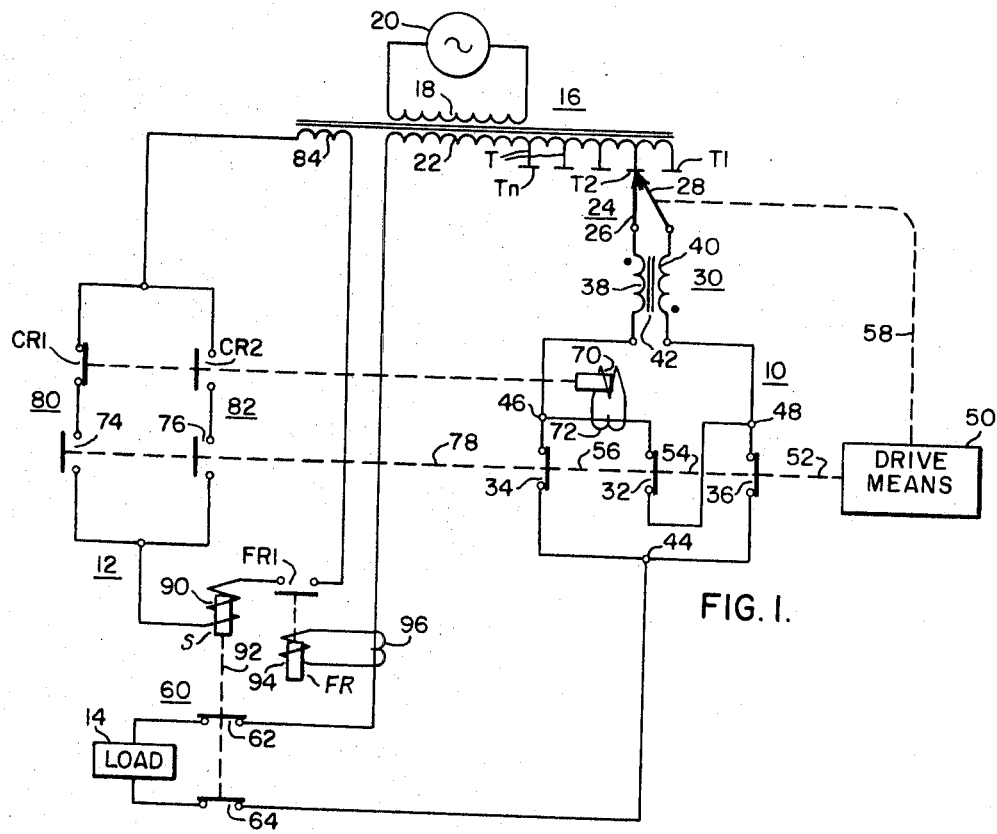

This invention relates in general to load tap changer systems, and more particularly to a protective control apparatus and circuitry for load tap changer systems.

Underload tap changer systems of the type which utilize a single underload transfer switch, two no-load transfer switches, and no-load selector switches, may be damaged if any of the no-load switches interrupt load current, due to a malfunction of one of the switches. For example, if the underload transfer switch fails to open at the proper time, the no-load selector switches will interrupt load current as the tap changer cycle progresses; if the underload transfer switch fails to close at the proper time, the no-load transfer switches will close under load, and on the next tap change cycle, will open under load; if one of the no-load transfer switches fails to open when required, one of the selector switches will operate under load; and, if both no-load transfer switches are not closed at the start of a tap change cycle, opening the closed no-load transfer switch will open the load circuit.

Therefore, it would be desirable to provide protective apparatus for tap changer systems of this type which will either open the load circuit breaker, or stop the tap changer before damage occurs; or, if the load is of the type which should not be interrupted, to sound an alarm to warn operating personnel. If an alarm is used, the operator should limit the number of tap changes to a minimum before overhaul, as the damage to the no-load switches caused by interrupting load current, is cumulative.

Accordingly, it is an object of the invention to provide a new and improved tap changer system.

Another object of the invention is to provide new and improved protective apparatus and circuitry for underload tap changers of the type which have a single underload transfer switch, and a plurality of no-load switches.

Still another object of the invention is to provide new and improved protective apparatus and circuitry for load tap changer systems which will automatically check the positions of the switches after each required switch operation, to determine if the required switch operation has occurred.

Briefly, the present invention accomplishes the above-cited objects by providing first and second sets of normally open contacts which are mechanically responsive to the tap changer apparatus and its tap changing cycle, and a relay having first and second sets of contacts which is responsive to current flow through the underload transfer switch. The first set of relay contacts being normally open, and the second set of relay contacts being normally closed. The first and second sets of normally open contacts close momentarily at predetermined times throughout the tap changer cycle. The first set of normally open contacts is connected to provide a first series circuit with the normally closed set of relay contacts, and the second set of normally open contacts is connected to provide a second series circuit with the normally open set of relay contacts. The first and second series circuits are connected in parallel with respect to a source of potential and protective or signal means. A completion of either the first or second series circuit will energize the signal means.

The first series circuit "checks" to determine if there is current flow through the underload transfer switch when it should be carrying current. Thus, the first normally open contact is disposed to close during those portions of the tap changer cycle when load current should be flowing through the underload transfer switch. If there is no current flow through the underload transfer switch, the normally closed relay contacts will be closed, and when the first normally open contacts close, a circuit will be completed through the signal means.

The second series circuit "checks" to determine if there is no current flow through the underload transfer switch when there should be no current flow. Thus, the second normally open contacts are disposed to close during those portions of the tap changer cycle when load current should not be flowing through the underload transfer switch. If there is load current flowing through the underload transfer switch, the normally open relay contacts will be closed, and when the second normally open contacts close, a circuit will be completed to the signal means.

Figure 2:
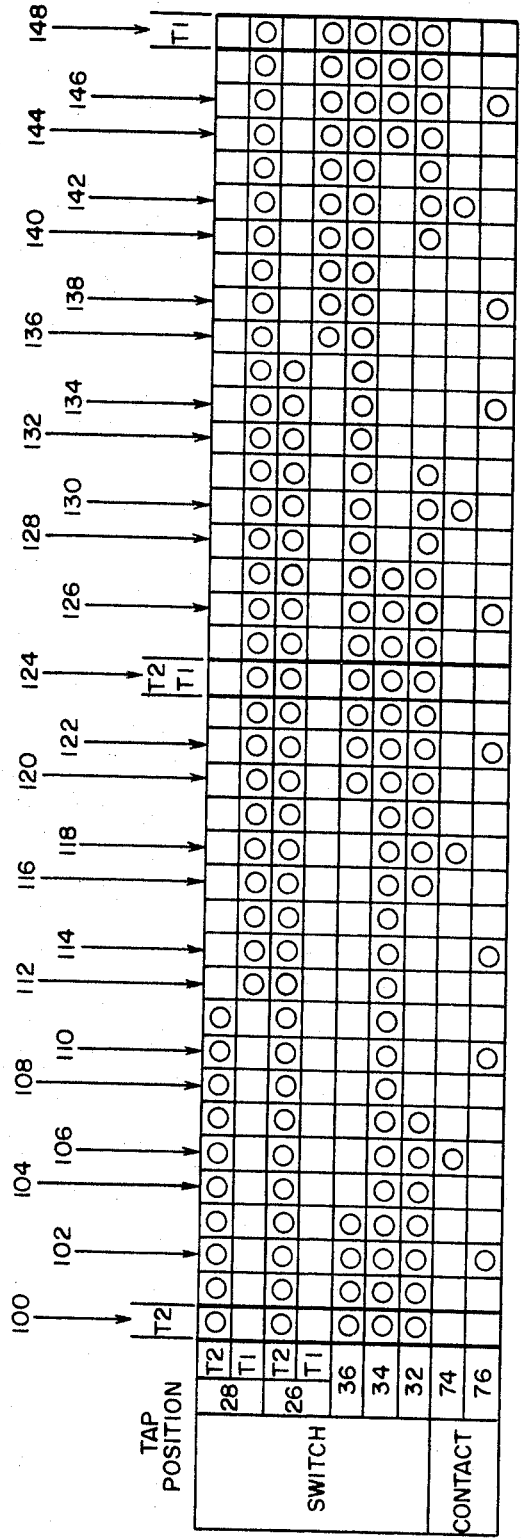

Further objects and advantages of the invention will become apparent from the following detailed description, taken in connection with the accompanying drawings, in which:

FIGURE 1 is a schematic diagram which illustrates the tap changer system and protective apparatus constructed and arranged according to the teachings of the invention, FIGURE 2 is a sequence chart which illustrates a complete tap changer cycle, and the locations during the cycle when the tap changer system is monitored by the protective apparatus, and FIGURES 3A–3F are schematic diagrams which sequentially illustrate the operation of the tap changer system shown in FIG. 1.

Referring now to the drawings, and FIG. 1 in particular, there is shown a schematic diagram of a tap changer system 10, which has protective means 12 constructed according to the teachings of the invention. While the tap changer system is shown in a single phase electrical system, for purposes of simplicity, the teachings of the invention are equally applicable to tap changer systems connected in polyphase electrical systems.

More specifically, the tap changer system 10 is connected to adjust the magnitude of the voltage applied to load circuit 14 by transformer 16, which has a primary winding 18 connected to a source 20 of alternating potential, and a tapped secondary winding 22 connected to load circuit 14 through tap changer system 10. Electrical winding 22 has a plurality of tap leads T adapted for connection to the tap changer system 10.

Tap changer system 10 includes selector switch means 24, preventive autotransformer means 30, underload transfer switch 32, and first and second no-load transfer switches 34 and 36. Selector switch 24, which is a no-load type switch, has a plurality of stationary contacts, such as contacts T1 through T*n* which are connected to the tap leads of winding 22, and two movable contact members or arms 26 and 28, which move sequentially between and make contact with the various stationary contacts T1 through T*n*, to effect tap changes on electrical winding 22.

Preventive autotransformer or reactor means 30 includes first and second winding sections 38 and 40 wound in inductive relation with a common magnetic core 42. The winding sections 38 and 40 are wound to cancel their impedance to the flow of load current, and to present a high impedance to the flow of circulating currents, which tend to flow when selector switch 24 is bridging two tap positions. In other words, the instantaneous polarities of adjacent ends of winding sections 38 and 40 will be opposite, due to load current flow, as shown in FIG. 1. Circulating currents, however, would provide similar instantaneous polarities at adjacent ends of the winding sections, and the windings would thus set up an impedance to their flow. Each of the winding sections 38 and 40 have first and second ends, with the first ends being connected to movable contact arms 26 and 28, respectively, of selector switch 24. The second ends of winding sections 38 and 40 are connected together at terminal 44, through no-load transfer switches 34 and 36, respectively. The second terminals of winding sections 38 and 40 are also connected together through underload transfer switch 32. Thus, underload transfer switch 32, when closed, always provides a parallel path for the load current around the no-load transfer switches 34 and 36, which allows them to be opened and closed in a predetermined sequence, without interrupting load current.

More specifically, first and second series circuits are provided between movable contact arms 26 and 28 of selector switch means 24 and terminal 44, with the first series circuit including movable contact arm 26 of selector switch means 24, winding section 38 of preventive autotransformer means 30, and no-load transfer switch 34. The second series circuit includes movable contact arm 28 of selector switch means 24, winding section 40 of preventive autotransformer means 30, and no-load transfer switch 36. The underload transfer switch 32 is connected across the second ends of winding sections 38 and 40 at terminals 46 and 48. Thus, when transfer switch 32 is closed, either of the no-load transfer switches 34 or 36 may be opened or closed without interrupting load current, as the load current flowing through the "opened" no-load transfer switch has an alternate path through underload transfer switch 32. After one of the no-load transfer switches has been opened, the underload transfer switch 32 may open, which isolates the series circuit which includes the open no-load transfer switch. The movable contact arm of selector switch 24 which is associated with this circuit may then be moved to a new tap position without interrupting load current.

This type of load tap changer system is less costly than the systems which utilize two underload transfer switches, but the no-load switches may be severely damaged if called upon to interrupt load current due to the malfunction of one of the transfer switches.

The transfer switches, including the no-load transfer switches 34 and 36, the underload transfer switch 32, and the selector switch 24, are driven by suitable drive means 50 through mechanical linkages and drive shafts, shown generally by dotted lines 52, 54, 56 and 58. Depending upon the nature of load circuit 14, drive means 50 may be manually controlled by an operator, or it may be responsive to regulator means (not shown), which regulates the voltage applied to load circuit 14 according to a predetermined quantity, such as load voltage, current, or phase angle.

Although the various switches are mechanically interconnected to operate in a predetermined sequence, it is posible due to a non-operation of one of the transfer switches, to create a condition where one of the no-load switches will have to interrupt load current if the tap changer cycle progresses. The no-load switches are not designed to interrupt load current, and to do so may cause them to be severely damaged. Therefore, it is important to have some protective means for monitoring or checking the tap changer system after each required switch operation throughout each tap change cycle, to determine if the proper switch has operated, and whether it is safe to proceed to the next portion of the tap changer cycle.

Depending upon the type of load circuit, the protective means may be associated with the line circuit breaker, to disconnect the load; it may be associated with the tap changer drive means 50 to disable the tap changer; or, it may be connected to an alarm to notify operating personnel that the tap changer system is malfunctioning and that corrective action should be taken without delay. For purposes of example, FIG. 1 illustrates protective means 12 associated with line circuit breaker 60, which has contacts 62 and 64 disposed to disconnect the load circuit 14 from transformer 16.

In general, protective means 12 includes a relay CR having an electromagnetic coil 70, a set of normally closed contacts CR1, and a set of normally open contacts CR2, current transformer means 72 disposed to be responsive to load current flow through underload transfer switch 32, and first and second sets of contacts 74 and 76 which are responsive to the mechanical position of the tap changer system 10 during a tap changer cycle, as shown generally by dotted line 78.

Electromagnetic coil 70 of relay CR is connected to current transformer means 72, with electromagnetic coil 70 of relay CR being energized when load current is flowing through underload transfer switch 32. Thus, when load current is flowing through underload transfer switch 32, contacts CR1 will be open, and contacts CR2 will be closed.

Contacts 74 and 76, which are normally open, close at predetermined times during a tap change cycle, and thus must be mechanically coordinated with tap changer system 10. For example, contacts 74 and 76 may be in the form of a sensor wheel having two spaced insulated circular "tracks" and two spaced contact arms which ride in the tracks, with the sensor wheel being keyed to the tap changer drive shaft. The circular tracks have spaced conductive portions which make contact with the contact arms at the desired times during the tap changer cycle. Or, contacts 74 and 76 may be cam operated, with the contacts closing in response to the cams which are mechanically associated with the drive means 50, or some portion of the drive means such as the drive shaft. Contacts 74 are disposed to close after each operation of one of the switches of the tap changer system 10 when there should be load current flowing through underload transfer switch 32; and contacts 76 are disposed to close after each operation of one of the switches in the tap changer system 10 when there should be no load current flow through underload transfer switch 32.

Normally closed contacts CR1 of relay CR and the first set of contacts 74 are serially connected to form a first series circuit 80 whose function is to check for load current flow through transfer switch 32 when load current should be flowing through this transfer switch. Normally open contacts CR2 of relay CR and contacts 76, are serially connected to form a second series circuit 82 whose function is to check for the absence of load current flow through transfer switch 32, when load current should not be flowing through this switch. The first and second series circuits 80 and 82 are connected in parallel circuit relation with respect to a source of potential, which may be a winding 84 on transformer 16, and in parallel with respect to the signal means which is energized when one of the first and second series circuits is completed. In this instance, the signal means is a trip solenoid S which has an electromagnetic coil 90 mechanically linked with circuit breaker 60, as shown generally by dotted line 92. When trip coil 90 is energized, circuit breaker 60 will be tripped, which disconnects load circuit 14 from transformer 16. Thus, the parallel circuit comprising series circuits 80 and 82 is serially connected with winding 84 and trip coil 90.

In order to prevent false operation of protective means 12 when there is no load on transformer 16, a relay FR having an electromagnetic coil 94 and normally open contacts FR1, may be connected to current transformer means 96, which is disposed to be responsive to current flow in the load circuit 14. The normally open contacts FR1 are serially connected with protective means 12, such that with no load on transformer 16, winding 84 will be unable to energize solenoid S. When the load circuit 14 is receiving load current, relay FR will be energized, closing contacts FR1, which allows protective means 12 to function normally.

Thus, if load current is flowing in load circuit 14, relay FR will be energized, closing contacts FR1. If load current is flowing through transfer switch 32 when it should be, contacts CR1 will be open when contacts 74 close, and solenoid S will not be energized. If no load current is flowing through transfer switch 32 when contacts 76 close, contacts CR2 will be open and solenoid S will not be energized. If no load current is flowing through transfer switch 32 when contacts 74 close, or load current is flowing through transfer switch 32 when contacts 76 close, solenoid S will be energized, tripping circuit breaker 60 and preventing the no-load switches from interrupting load current, or closing on load current.

The coordination of contacts 74 and 76 with the operation of selector switch movable contact arms 26 and 28, and transfer switches 32, 34 and 36, is illustrated in the tap changer sequence chart shown in FIG. 2. The tap changer sequence chart of FIG. 2 illustrates a complete tap change cycle from tap position T2 to tap position T1, or from tap position T1 to tap position T2.

FIGS. 3A–3F are schematic diagrams which sequentially illustrate the operation of the selector and transfer switches from tap position T2 to the bridging position wherein taps T2 and T1 are bridged by tap changer system 10. FIGS. 2 and 3A–3F will be referred to in the following description of the operation of protective means 12 shown in FIG. 1.

Figure 3A:
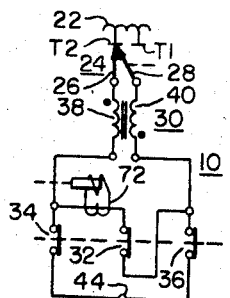
Figure 3B:
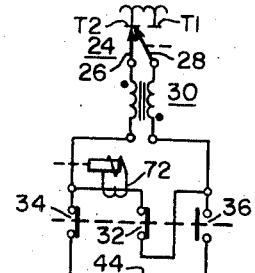
Figure 3C:
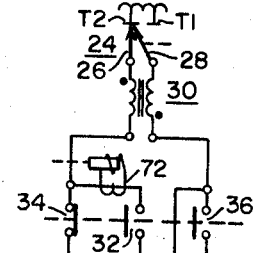

As illustrated in FIG. 3A, the tap changer system 10 is in a steady state position on tap position T2. Both movable selector arms 26 and 28 are on tap position T2, and all transfer switches are closed. This is illustrated by vertical column 100 in the tap changer sequence chart shown in FIG. 2. When tap changer drive means 50 starts to turn in the direction to change the tap changer apparatus to tap position T1, contacts 76 close as shown in column 102, to assure that both no-load transfer switches 34 and 36 are closed, signified by an absence of load current in transfer switch 32. This check point is not absolutely essential when going in the direction from tap position T2 to tap position T1, as the condition of the circuit would have already been checked when the tap changer arrived at tap position T2 from its previous tap position. This check point is essential however, when changing from tap position T1 to tap position T2, and it does insure that nothing has happened to affect the closed positions of transfer switches 34 and 36 since the last tap change cycle. After check point 102 is satisfactorily passed, no-load transfer switch 36 opens, as shown in FIG. 3B, and in column 104 of the tap changer sequence chart shown in FIG. 2. If transfer switch 36 has operated properly, load current should be flowing through transfer switch 32. This condition is checked in column 106 by the closing of contacts 74. If transfer switch 36 opened as scheduled, the load current flow through transfer switch 32 and current transformer means 72 will energize relay CR, opening contacts CR1. Thus, when contacts 74 close as indicated in column 106, protective means 12 will not be energized. It is important to check at this point, as the failure of transfer switch 36 to open will cause movable contact arm 28 to interrupt load current later in the tap change cycle. After passing check point 106, underload transfer switch 32 opens, as shown in FIG. 3C and in column 108 of FIG. 2. If transfer switch 32 fails to open, movable contact arm 28 will interrupt load current later in the tap changer cycle. Therefore, contacts 76 close as shown in column 110 of FIG. 2. If transfer switch 32 is open, contacts CR2 will be open, and the closing of contacts 76 will not operate protective means 12.

Figure 3D:
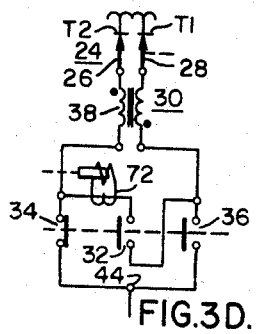

After passing check point 110, movable contact arm 28 may be safely switched to tap position T1, as shown in FIG. 3D, and in column 112 of FIG. 2, as the load current is flowing only in the circuit comprising movable contact arm 26, winding section 38 of preventive autotransformer 30, and transfer switch 34. Contacts 76 close, as shown at column 114 of FIG. 2, but this check is necessary only when going from tap position T1 to tap position T2, and has no significance when going from tap position T2 to tap position T1.

Figure 3E:
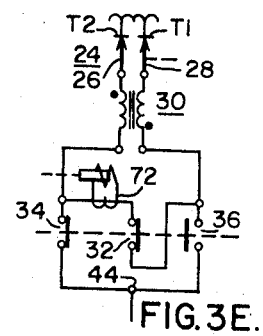

Underload transfer switch 32 now closes, as shown in FIG. 3E, and in column 116 of FIG. 2. If transfer switch 32 fails to close as scheduled, transfer switch 36 will have to close under load. Therefore, transfer switch 32 is checked for current flow by the closing of contacts 74, indicated at column 118 of FIG. 2.

Figure 3F:
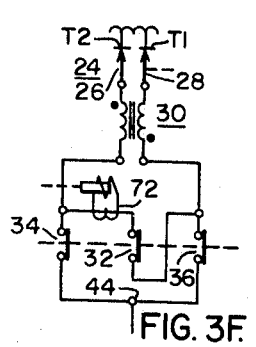

After passing check point 118, transfer switch 36 closes, as shown in FIG. 3F, and in column 120 of FIG. 2. If transfer switch 36 fails to close, transfer switch 34 will be called upon to open under load later during the tap change cycle. Contacts 76 close, as shown in column 122, to check for the absence of load current in transfer switch 32, and thus assure the closing of transfer switch 36. After passing check point 122, the tap changer system 10 reaches a steady state position wherein the voltage at terminal 44 is midway between the voltage of tap positions T2 and T1. If the tap changer cycle is continued in the same direction, contacts 76 close, as indicated at column 126 of FIG. 2, which checkpoint is only essential when going from tap position T1 to tap position T2. Transfer switch 34 opens as indicated at column 128, contacts 74 close to check the operation of transfer switch 34, transfer switch 32 opens, as indicated in column 132, contacts 76 close to check the operation of transfer switch 32, movable contact arm 26 moves from tap position T2 to tap position T1, as indicated in column 136, contacts 76 close as indicated in column 138, which checkpoint is unnecessary in the present direction of the tap changer cycle, but necessary for operation in the reverse direction, transfer switch 32 closes as indicated in column 140, contacts 74 close as indicated in column 142 to check the operation of transfer switch 32, transfer switch 34 closes, as indicated in column 144, contacts 76 close as indicated in column 146 to check the operation of transfer switch 34, and steady state operation on tap position T1 is reached as indicated at column 148.

For the operation of the tap changer system 10 from tap position T1 to tap position T2, the sequence chart of FIG. 2 should be followed from right to left.

In summary, there has been disclosed new and improved protective means which monitors or checks a tap changer system of the type which utilizes a single underload transfer switch, after each operation of the various switches in the tap changer system. If any of the switches fail to function when required, the protective means is energized, which may be used to protect the no-load switches from interrupting load current, or which may be used to sound an alarm to alert operating personnel.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A load tap changer system comprising:

tap changer means having first, second and third transfer switch means, and selector switch means, said tap changer means being adapted for changing taps on an electrical winding connected to supply load current to a load circuit, drive means operating said first, second and third transfer switch means and said selector switch means in a predetermined sequence during a tap changing cycle, to change taps on the electrical winding while interrupting load current only in said third transfer switch means, first and second contact means, means closing said first contact means at predetermined spaced times in a tap changing cycle during which there should be load current flow through said third transfer switch means, means closing said second contact means at predetermined spaced times in a tap changing cycle during which there should be no load current flow through said third transfer switch means, means responsive to load current flow in said third transfer switch means having normally closed and normally open contacts, which open and close, respectively, when load current flows in said third transfer switch means, said normally closed contacts and said first contact means being connected to provide a first series circuit, said normally open contacts and said second contact means being connected to provide a second series circuit, said first and second series circuit being connected in parallel circuit relation, signal means, a source of electrical potential, said parallel connected first and second series circuits, said signal means, said source of electrical potential being serially connected.

2. The load tap changer system of claim 1 wherein said predetermined spaced times at which said first and second contacts close during a tap change cycle follow the intended operational points of the first, second and third transfer switches in the tap changer cycle.

3. The load tap changer system of claim 1 wherein said signal means is an alarm.

4. The load tap changer system of claim 1 wherein said signal means is adapted to disable said tap changer means.

5. The load tap changer system of claim 1 wherein said signal means is adapted to disconnect the load circuit from the tapped winding.

6. The load tap changer system of claim 1 wherein said means responsive to load current flow in said third transfer switch includes current transformer means and relay means.

7. The load tap changer system of claim 1 including means responsive to load current flow having normally open contacts connected to prevent said source of electrical potential from energizing said signal means in the absence of load current flow.

8. A load tap changer system comprising:

tap changer means having a selector switch and a plurality of transfer switches, drive means operating said selector and transfer switches in a predetermined sequence in a tap change cycle, and protective means, said protective means monitoring said tap changer means after each intended operation of said selector and transfer switches, to insure that the switches functioned as required, said protective means including first means which provides signals responsive to the presence and absence of current flow in a predetermined transfer switch, second means signaling the required current flow condition in said predetermined transfer switch after each intended operation of said selector and transfer switches, and circuit means comparing the signals of said first and second means, said circuit means completing an electrical circuit when the comparison of the signals from said first and second means indicates a malfunction of one of said switches.

9. The load tap changer system of claim 8 wherein said plurality of transfer switches includes one underload type transfer switch, and two no-load type transfer switches, which are electrically connected and sequenced to interrupt load current in said underload transfer switch during a tap change cycle; said predetermined transfer switch being said underload transfer switch.

References Cited

UNITED STATES PATENTS

| 3,308,374 | 3/1967 | Kagawa et al. | 323—43.5 |
| 3,358,219 | 12/1967 | Bühler | 323—43.5 |
| 3,359,485 | 12/1967 | Bühler | 323—43.5 |

JOHN F. COUCH, *Primary Examiner.*

G. GOLDBERG, *Assistant Examiner.*

U.S. Cl. X.R.

317—11, 14; 323—62